Oct. 13, 1931.  C. E. BALL  1,827,414
WAGON GRADER
Filed Sept. 16, 1929  4 Sheets-Sheet 2
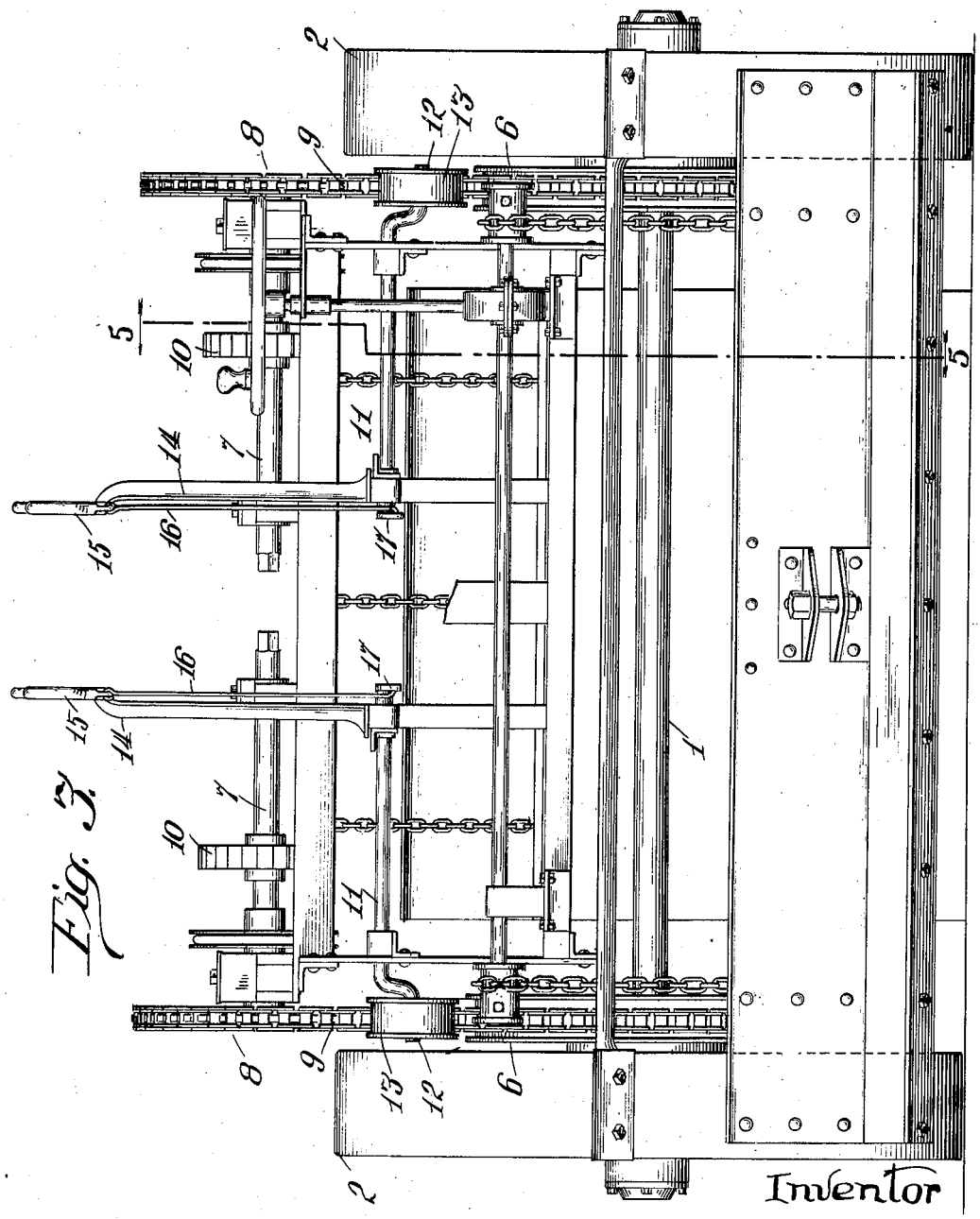
Inventor
Charles E. Ball
By
Attorney.

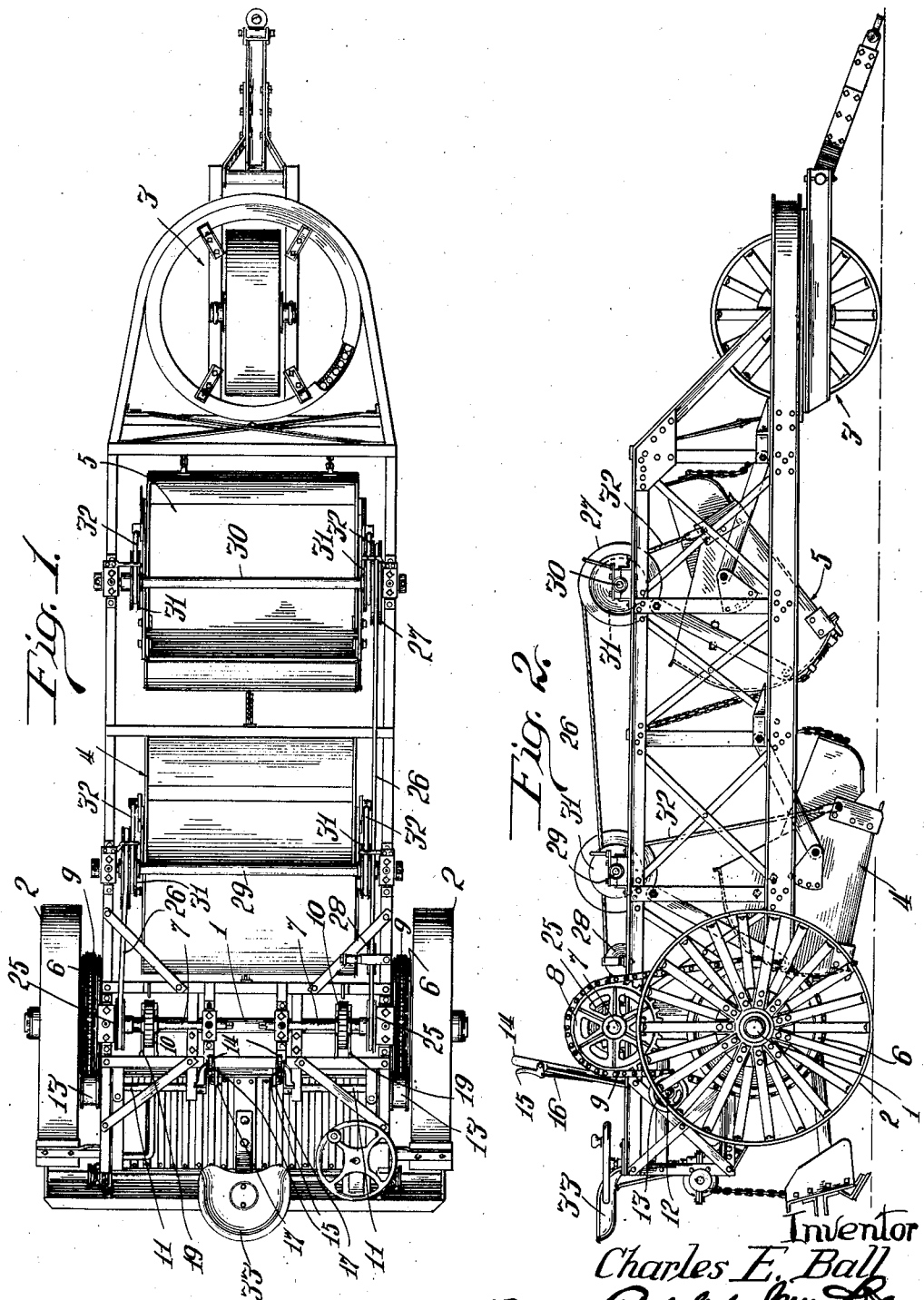

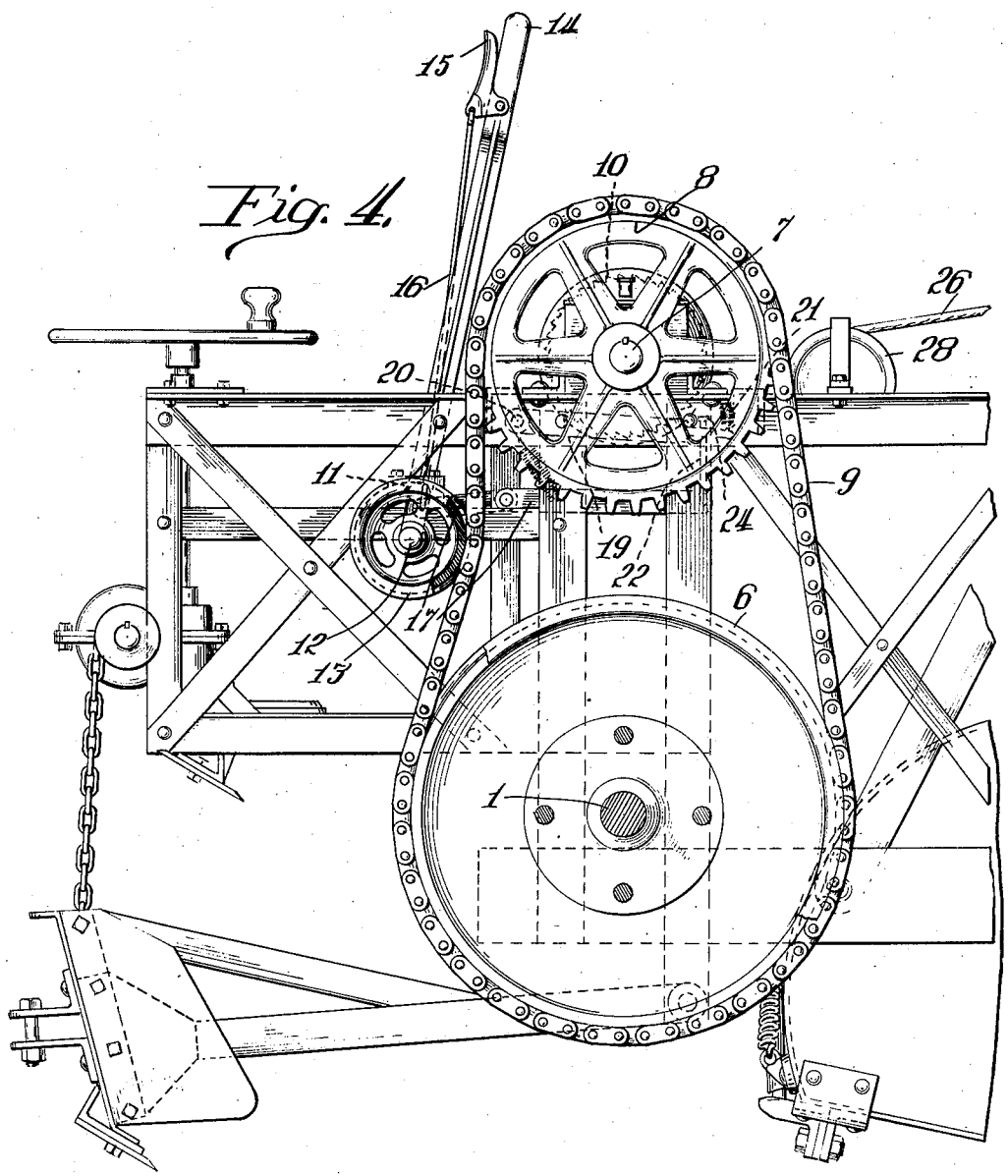

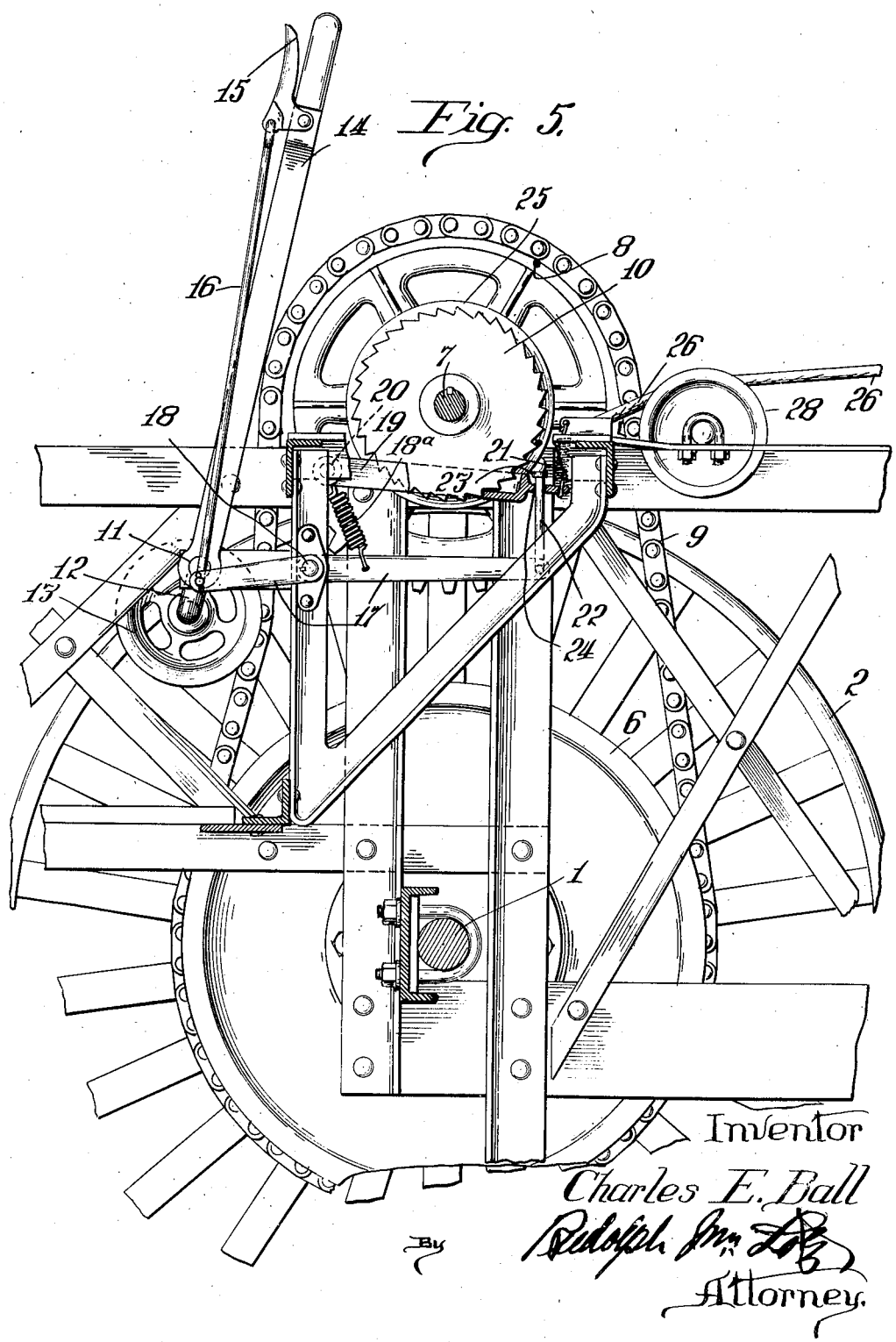

Patented Oct. 13, 1931

1,827,414

UNITED STATES PATENT OFFICE

CHARLES E. BALL, OF TURLOCK, CALIFORNIA

WAGON GRADER

Application filed September 16, 1929. Serial No. 393,069.

This invention relates to improvements in grading apparatus of the type wherein scoops or buckets scrape and gather up earth and carry and dump the same as determined by the operator.

The instant invention is intended and adapted particularly for the type of grader wherein the vehicle frame carries a pair of independently operable scoops thus necessitating independent manually operable control means for each thereof, the main object of the invention being to limit the control means to one lever for each scoop, so that the operator may keep one hand on each lever and thus operate the scoops separately or in unison without requiring that he release one lever in order to use that hand also for effecting the desired operation of one of the scoops.

The invention is suitably illustrated in the accompanying drawings wherein:

Fig. 1 is a plan view of a grader constructed in accordance with the invention.

Fig. 2 is a side elevation of the same.
Fig. 3 is a rear elevation of the same.

Fig. 4 is a fragmentary side elevation of the rear end portion of the machine.

Fig. 5 is a fragmentary vertical longitudinal section on the line 5—5 of Fig. 3.
The machine comprises a suitable trussframe supported at its rear end portion on the shaft or axle 1 of the traction wheels 2 and at its forward end upon a suitable front truck 3. The scoops or buckets 4 and 5 are pivotally suspended between the side frame members between the truck 3 and the shaft 1.

The wheels 2 are rotatable on said shaft 1 and each thereof is equipped with a flanged pulley or sheave 6 which is concentric therewith.

Suitably journalled in bearings and disposed above and parallel with the shaft 1 are two axially aligned countershafts 7, each of which is equipped with a sprocket wheel 8 over which a sprocket chain 9 is trained, the latter being also loosely trained over the said pulley or sheave 6. Each of said shafts 7 is also equipped with a ratchet wheel 10.

Disposed rearwardly of and below each of the shafts 7 and extending parallel therewith, is a crank shaft 11 which is journalled in suitable bearings and has its crank 12 disposed at its outer end and provided with a rotatable flanged idle pulley 13 which engages the sprocket chain 9 to contract the same about the sheave or pulley 6 constituting a friction drive member to thereby transmit rotary motion from the wheel 2 to the sprocket wheel 8 and shaft 7.

Rigid with the crank-shaft 11 is a lever 14 by means of which said shaft 11 is rocked. Pivotally secured to the lever 14 is a grip or hand lever 15 of the bell crank type. To the elbow portion of the latter a rod 16 is pivotally secured at one end and at the other end is pivoted to one end of a lever 17 which is pivotally mounted between its ends on a frame member by means of the shaft 18.

The pivotal connection between said rod 16 and the lever 17 is so disposed with reference to the axis of the crank shaft 11 that when the hand lever 14 is operated, said pivotal connection or axis will describe an arc which intersects the axis of the shaft 11, the length of said arc being such that when the said lever 15 is in the position shown in Fig. 5, said pivotal connection between the rod 16 and the lever 17 will be disposed slightly below the axis of the crank-shaft 11 and when said hand lever 15 is so pressed that its upper end portion is in contact with the lever 14, said pivotal connection will be disposed a substantially equal distance above said crankshaft axis. The purpose of this relative disposition of the crank-shaft and said pivotal connection between the rod 16 and lever 17 is to permit the lever 14 to be rocked to the extent necessary to control the driving association of the pulley 6 with the sprocket wheel 8, the lever 17 retaining any position in which it may be found.

The lever 17 is normally held in the position shown in Fig. 5 by means of the tension spring 18ª engaged at one end with said lever 17 and at its other end with a frame-member.

A dog or pawl 19, consisting of a channeled member provided with a slot between its ends through which the lower portion of the ratchet wheel 10 projects, is pivotally secured at one end to the machine frame as shown at 20, the other end portion being engaged with the lower end of a tension spring 21 which maintains said pawl 19 normally engaged with said ratchet wheel 10. A rod 22 provided at its upper end with a head 23, passes through a slot 24 in the pawl 19 and is pivotally secured at its other end to the last-mentioned end portion of the lever 17, the head 23 being normally disposed out of engaging relation to the pawl 19 but engaging the latter to release it from engagement with the said ratchet wheel 10 when the hand lever 15 is pressed at its upper end against the lever 14.

Thus the operator uses only one hand to operate the levers 14 and 15, the relation of the former with respect to the lever 17 being such, as above described, as will permit the operator to control the position of the pawl 19 with respect to the ratchet wheel 10 in every position of the lever 14, the movements of the latter independently of any operation of the hand lever 15, having no effect whatsoever upon the lever 17 and pawl 19.

On the shaft 7, there is mounted a winding sheave or drum 25 having a deep narrow groove wherein the cable 26 may wind spirally helically upon itself. Said cable 26 is secured at one end to the sheave 25 at a point in the bottom of the groove of the latter and, at its other end, is similarly secured to a similar sheave 27. Between its ends said cable passes over an idle sheave 28.

The sheave 27 is rigid with one of two countershafts 29 and 30, each of which is equipped with two sheaves 31, disposed at opposite sides of the frame. These sheaves 31 are of the same type as the sheaves 25 and 27. A pair of cables 32 are attached at one end each to one of the sheaves 31 similarly to the mode of attachment of the cable 26 to the sheaves 25 and 27, the other ends of said cables 32 being attached to the front end portion of a bucket. The shaft 29 is associated with the scoop or bucket 4 and the shaft 30 with the scoop or bucket 5. The foregoing description of sheaves and cables being the set associated with the scoop or bucket 5 at the front of the frame, a similar set, omitting the idle sheave 28, being associated with the scoop or bucket 4.

The said scoops or buckets 4 and 5 are adapted to be positioned to cut or scrape and take in earth and, when filled, to be tilted to carrying position and further tilted to dumping position, as particularly described in my companion application, Serial No. 393,068, filed of even date herewith.

The positions of the cables 26 and 32 with respect to the sheaves 25 and 31 is such that when the scoop 5 is in scraping and loading position, said cables are unwound from said sheaves, the cable 26 being then wound at one end portion upon the sheave 27.

Assuming the scoop 5 to be loaded and that the operator desires to tilt the same to carrying position, the lever 14 is thrown back thereby throwing in the chain-drive and rotating the shaft 7 and sheave 25. The cable 26 now winds upon the latter at the same time unwinding from the sheave 27 while the cables 32 wind upon the sheaves 31. Thus the initial tilting movement of the scoop 5 is slow and increases gradually in speed.

The pawl 19 is now disposed in engaging relation to the ratchet wheel 10 so that when the scoop 5 reaches the position desired by the operator the lever 14 may be returned to its normal position to thus release the chain-drive. The pawl 19 and ratchet wheel 10 now function to retain the scoop 5 in its tilted position.

Should the operator desire to drop the scoop back to scraping and loading position, he now operates only the hand lever 15 to release the pawl from the ratchet wheel, though generally it is necessary to again throw in the chain-drive for an instant to break contact between the pawl and the ratchet wheel before the hand lever 15 can be operated by reason of the friction due to the weight of the load in the scoop 5.

Should the operator desire to tilt the bucket from carrying to dumping position, he throws in the chain-drive without operating the hand lever 15 and throws out the chain-drive when the scoop has attained dumping position. Then, when said scoop is empty, the hand lever 15 is easily operated to release the pawl from the ratchet wheel while the chain-drive is released, whereupon the scoop will drop back to scraping and loading position.

The levers 14 and 15 may also be operated to throw the edges of side flanges of the scoop sharply against the shaft 30 repeatedly by permitting the scoop to drop slightly back from its dumping toward loading position by operation of the lever 15 while the chain-drive is released, then releasing lever 15 while throwing the chain-drive in to cause the scoop to again sharply strike the shaft 30, then releasing said chain-drive and again operating the lever 15, these alternate movements being easy of accomplishment with one hand.

Thus the operator, disposed on the seat 33, controls a scoop with each hand without need of both hands to operate either one of them, this being very important to most efficient use of the grader as will be readily appreciated.

I claim as my invention:

1. In a machine of the kind specified, a traction wheel, a shaft, a sprocket wheel rigid with the latter, a pulley rigid with said traction wheel, a sprocket chain trained over the latter and said sprocket wheel and normally disengaged from the former, a crank-shaft, an idler on the crank thereof disposed to tighten said chain about said pulley to cause the latter to propel said chain, a lever on said crank-shaft for rocking the same to throw said idler into and out of engagement with said chain, means associating said first-named shaft with a tiltable scoop, a ratchet wheel on said shaft, a spring-held pawl normally engaging said ratchet wheel, a rocking lever with the lever associated with said pawl, for disengaging the same from said ratchet wheel, a hand lever pivotally mounted on said first-named lever, a rod connecting said hand lever with the lever associated with said pawl, the connection between the last-named lever and said rod being such that said crank-shaft rocking lever may be operated without disturbing the relation of the pawl and ratchet wheel while enabling the said hand lever to be operated at any point in the movement of said crank-shaft rocking lever to cause the said pawl to be disengaged from the ratchet wheel.

2. In a grader, a tiltable scoop gravity held in scraping and loading position, a shaft operatively associated with said scoop for tilting the same to other positions, a traction wheel, a friction drive means associating the same with said shaft for actuating the latter, a rock-shaft controlling said friction drive means, a ratchet wheel on said first-named shaft, a spring-held pawl normally engaged with said ratchet wheel for preventing rotation of said shaft responsively to gravity actuation of said scoop, a lever on said rock-shaft, a hand lever pivotally mounted on said lever, a lever associated with said pawl for releasing the latter from said ratchet wheel, and connection between said last-named lever and said hand lever arranged to enable the first-named lever to be operated to throw in and release said friction drive means without disturbing the normal position of said pawl and enabling the hand lever to be actuated at any point in the movement of said first-named lever to release said pawl.

CHARLES E. BALL.